US012770075B2

(12) United States Patent
Pydin

(10) Patent No.: US 12,770,075 B2
(45) Date of Patent: Oct. 20, 2026

(54) OPERATION SCHEDULE MANAGEMENT DEVICE OPERATION SCHEDULE MANAGEMENT METHOD, AND OPERATION SCHEDULE MANAGEMENT SYSTEM

(71) Applicant: HONDA MOTOR CO., LTD., Tokyo (JP)

(72) Inventor: Andrii Pydin, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 661 days.

(21) Appl. No.: 18/127,780

(22) Filed: Mar. 29, 2023

(65) Prior Publication Data

US 2024/0330800 A1 Oct. 3, 2024

(51) Int. Cl.
*G06Q 10/0631* (2023.01)

(52) U.S. Cl.
CPC .............................. *G06Q 10/06312* (2013.01)

(58) Field of Classification Search
CPC ................................................ G06Q 10/06312
See application file for complete search history.

(56) References Cited

U.S. PATENT DOCUMENTS

2005/0080524 A1* 4/2005 Park ........................ G06Q 10/08 701/25
2021/0300407 A1* 9/2021 Yamamoto ............ B60W 50/00
2021/0309260 A1* 10/2021 Higashide .......... G06Q 10/0631

FOREIGN PATENT DOCUMENTS

JP 2018-206187 12/2018

* cited by examiner

*Primary Examiner* — Rachid Bendidi
*Assistant Examiner* — Hana Victoria Hall
(74) *Attorney, Agent, or Firm* — Amin, Turocy & Watson, LLP

(57) ABSTRACT

An operation schedule management device includes an acquisition unit (401), a determination unit (402), a setting unit (403), and an adjustment unit (404). The acquisition unit (401) acquires an operation schedule (600) of each of a plurality of mobile objects. The determination unit (402) determines presence of an overlapping stop indicating that a plurality of mobile objects stop at the same position at the same time on the basis of the operation schedules (600). The setting unit (403) sets a stoppable range in which a plurality of mobile objects are able to stop at the same position. The adjustment unit (404) adjusts stop locations of the mobile objects such that the stop locations do not overlap in the stoppable range when the determination unit (402) determines that the overlapping stop is present.

8 Claims, 7 Drawing Sheets

610 600

| VEHICLE | NODE | ARRIVAL TIME | DEPARTURE TIME | INFORMATION OF LOAD | |
|---|---|---|---|---|---|
| | | | | PRESENCE OF LOAD | WEIGHT |
| C001 | N001 | 00:00:00 | 00:00:00 | YES | ○○kg |
| | N035 | 00:00:00 | 00:00:00 | NO | — |
| | N053 | 00:00:00 | 00:00:00 | YES | ○○kg |
| | ... | ... | ... | ... | ... |
| C002 | N001 | 00:00:00 | 00:00:00 | YES | ○○kg |
| | ... | ... | ... | ... | ... |
| ... | ... | ... | ... | ... | ... |

FIG. 11

610 1100

| VEHICLE | NODE | STOP LOCATION | ARRIVAL TIME | DEPARTURE TIME | ... |
|---|---|---|---|---|---|
| C001 | N001 | 701a | 00:00:00 | 00:00:00 | ... |
| ... | ... | ... | ... | ... | ... |
| C002 | N001 | 701c | 00:00:00 | 00:00:00 | ... |
| ... | ... | ... | ... | ... | ... |

OPERATION SCHEDULE MANAGEMENT DEVICE OPERATION SCHEDULE MANAGEMENT METHOD, AND OPERATION SCHEDULE MANAGEMENT SYSTEM

BACKGROUND OF THE INVENTION

Field of the Invention

The present invention relates to an operation schedule management device, an operation schedule management method, and an operation schedule management system.

Description of Related Art

Recently, autonomous traveling type mobile objects have increasingly spread. For example, in construction sites or factories, a plurality of autonomous traveling type mobile objects may be used for carrying a load. An operation schedule is prepared for each mobile object. Each mobile object carries a load to a predetermined stop position along a predetermined route on the basis of the operation schedule. At the stop position, loading/unloading of a load is performed by a work staff.

In the related art, a technique of determining a preferential stop position close to an aircraft or a regular stop position far from the aircraft as a position at which a vehicle is to stop on the basis of a required time from boarding start of a user on the vehicle to boarding end thereof in an aircraft terminal is disclosed (for example, see Patent Document 1).

PATENT DOCUMENTS

[Patent Document 1] Japanese Unexamined Patent Application, First Publication No. 2018-206187

SUMMARY OF THE INVENTION

However, in the related art, a plurality of mobile objects may stop at the same stop position at the same time in an overlapping manner. Accordingly, when a mobile object is stopped in front of another mobile object at the time of departure of the other mobile object, the other mobile object may not be able to depart as described in an operation schedule. As a result, there is concern of a delay of operation in the related art.

The present invention was made in consideration of the aforementioned circumstances and an objective thereof is to curb a delay in operation.

An operation schedule management device, an operation schedule management method, and an operation schedule management system according to the present invention employ the following configurations.

(1) According to an aspect of the present invention, there is provided an operation schedule management device including: an acquisition unit (401) configured to acquire an operation schedule (600) of each of a plurality of mobile objects; a determination unit (402) configured to determine presence of an overlap stopping indicating that a plurality of mobile objects stop at the same position (620) at the same time on the basis of the operation schedules; a setting unit (403) configured to set a stoppable range in which a plurality of mobile objects are able to stop at the same position; and an adjustment unit (404) configured to adjust stop locations of the mobile objects such that the stop locations do not overlap in the stoppable range (700) when the determination unit (402) determines that the overlapping stop is present.

(2) In the aspect of (1), the operation schedule (600) may include a departure time at which the corresponding mobile object departs from the same position, and the adjustment unit (404) may adjust the stop location of a mobile object with an earlier departure time out of the plurality of mobile objects to an area which is located in front of the corresponding mobile object in a traveling direction of the mobile object in the stoppable range.

(3) In the aspect of (1) or (2), the operation schedule (600) may include information of a load loaded on the corresponding mobile object, and the adjustment unit (404) may adjust the stop locations of the mobile objects on the basis of the information of a load.

(4) In the aspect of (3), the information of a load may include presence information indicating whether the load is present, and the adjustment unit (404) may adjust the stop location of a mobile object having the load to an area close to an outer edge of the stoppable range on the basis of the presence information.

(5) In the aspect of (3), the information of a load may include weight information indicating a weight of the load, and the adjustment unit (404) may adjust the stop location of a mobile object to an area closer to an outer edge of the stoppable range as the weight of the load becomes larger on the basis of the weight indicated by the weight information.

(6) In the aspect of (1) or (2), the stoppable range may be an area including a plurality of sections (701), the stop location of each mobile object may be one section of the plurality of sections, and the adjustment unit (404) may adjust the stop locations of the mobile objects such that two sections adjacent to each other in a longitudinal direction with respect to a traveling direction of the mobile objects are not both set as the stop locations or such that two sections adjacent to each other in a lateral direction with respect to the traveling direction are not both set as the stop locations.

(7) According to another aspect of the present invention, there is provided an operation schedule management method that is performed by a computer of an operation schedule management device, the operation schedule management method including: an acquisition step (401) of acquiring an operation schedule (600) of each of a plurality of mobile objects: a determination step (402) of determining presence of an overlapping stop indicating that a plurality of mobile objects stop at the same position at the same time on the basis of the operation schedules: a setting step of setting a stoppable range in which a plurality of mobile objects are able to stop at the same position; and an adjustment step (404) of adjusting stop locations of the mobile objects such that the stop locations do not overlap in the stoppable range when it is determined in the determination step (402) that the overlap stopping is present.

(8) According to another aspect of the present invention, there is provided an operation schedule management system (1) including a plurality of mobile objects and an operation schedule management device configured to manage operation schedules (600) of the plurality of mobile objects, wherein the operation schedule management device includes: an acquisition unit (401) configured to acquire the operation schedules of the plurality of mobile objects; a determination unit (402)

configured to determine presence of an overlapping stop indicating that a plurality of mobile objects stop at the same position (620) at the same time on the basis of the operation schedules; a setting unit (403) configured to set a stoppable range in which a plurality of mobile objects are able to stop at the same position; and an adjustment unit (404) configured to adjust stop locations of the mobile objects such that the stop locations do not overlap in the stoppable range when the determination unit (402) determines that the overlapping stop is present.

According to the aspects of (1) to (8), it is possible to curb a delay in operation.

BRIEF DESCRIPTION OF THE DRAWINGS

FIG. 11 is a diagram illustrating an example of an operation schedule 1100 after stop locations have been adjusted.

DETAILED DESCRIPTION OF THE INVENTION

Hereinafter, an operation schedule management device, an operation schedule management method, and an operation schedule management system according to an embodiment of the present invention will be described with reference to the accompanying drawings. In the following description, an example in which the operation schedule management device, the operation schedule management method, and the operation schedule management system are applied to carrying of a load in a construction site will be described.

[Configuration of Operation Schedule Management System 1]

Figure 1:
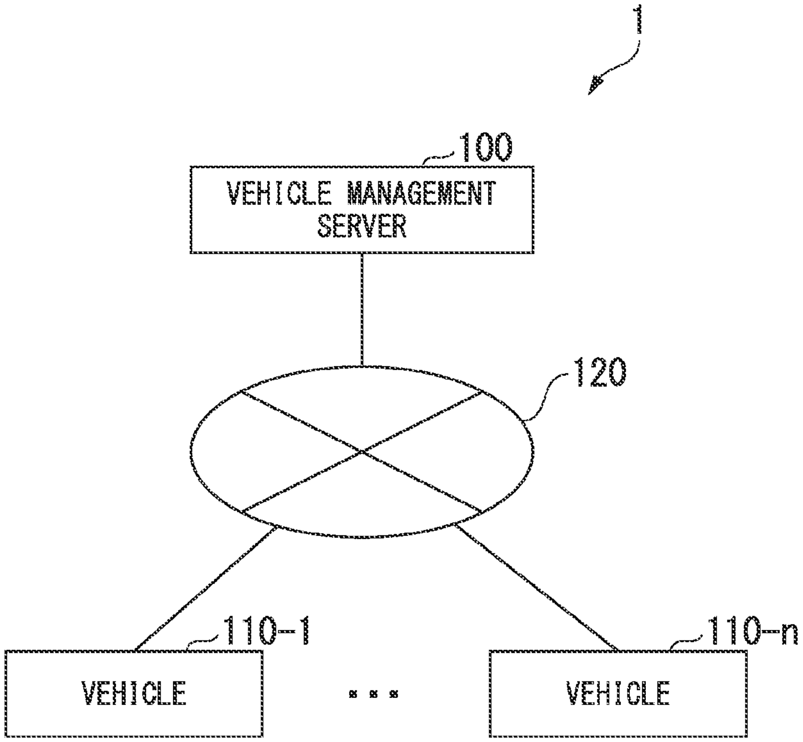
FIG. 1 is a diagram illustrating a configuration of an operation schedule management system 1 according to an embodiment.

FIG. 1 is a diagram illustrating a configuration of an operation schedule management system 1 according to an embodiment. In FIG. 1, the operation schedule management system 1 includes an operation schedule management server 100 and a plurality of vehicles 110 (110-1 to 110-*n*). The operation schedule management server 100 and the plurality of vehicles 110 are communicatively connected to each other via a network 120. The operation schedule management server 100 and the vehicles 110 each include a central processing unit (CPU), a read only memory (ROM), a random-access memory (RAM), and a communication unit.

The operation schedule management server 100 is an example of an operation schedule management device. The operation schedule management server 100 manages operation schedules of the plurality of vehicles 110. An operation schedule includes a stop position (a node at which the corresponding vehicle is scheduled to stop), a traveling route, and presence of a load or a weight thereof at each time. The stop position includes a loading/unloading position (a loading position, an unloading position) and a standby position.

Each vehicle 110 is an example of a mobile object. The vehicle 110 travels autonomously in a construction site. The vehicle 110 carries a load on the basis of its operation schedule. Specifically, the vehicle 110 waits for loading a load at a loading position at a predetermined time. Loading of a load is performed by a work staff. When loading of a load ends and a predetermined departure time has come, the vehicle 110 departs to a target position which is a next stop position. Then, the vehicle 110 arrives at the target position at a scheduled arrival time. At the target position, unloading is performed by a work staff. When unloading has been performed, the vehicle 110 waits at the position or is subjected to loading a load and departs to a next destination on the basis of the operation schedule.

[Hardware Configuration of Operation Schedule Management Server 100]

Figure 2:
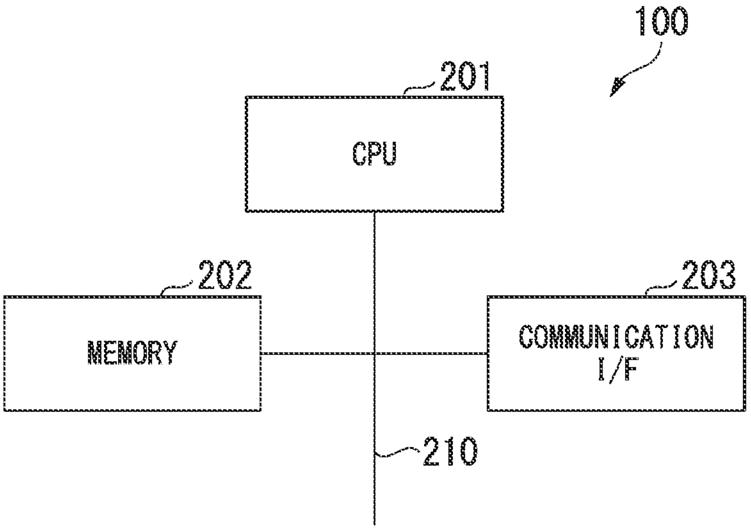
FIG. 2 is a block diagram illustrating an example of a hardware configuration of an operation schedule management server 100.

FIG. 2 is a block diagram illustrating an example of a hardware configuration of the operation schedule management server 100. In FIG. 2, the operation schedule management server 100 includes a CPU 201, a memory 202, and a communication interface (/F) 203. The constituent units are connected to each other via a bus 210.

The CPU 201 is a central processing unit and controls the operation of the operation schedule management server 100 by reading and executing various programs stored in the memory 202. The various programs include an operation schedule management program according to this embodiment.

The memory 202 includes, for example, a ROM, a RAM, a hard disk, and a solid-state drive (SSD). The ROM is a memory dedicated for reading and stores various types of information used by the CPU 201 in addition to programs. The RAM is a readable or writable memory and stores various types of information. For example, the RAM stores information acquired from the outside or information generated through processing. The memory 202 includes a detachable storage medium such as a USB memory or an optical disc.

The communication I/F 203 serves as an internal interface between the network 120 and the server and controls inputting and outputting of data from and to another device such as a vehicle 110. The other device includes an information communication device such as a PC or a smartphone that is operated by a work staff in the construction site. In the following description, the information communication device that is operated by a work staff is referred to as a "work staff terminal."

[Hardware Configuration of Vehicle 110]

Figure 3:
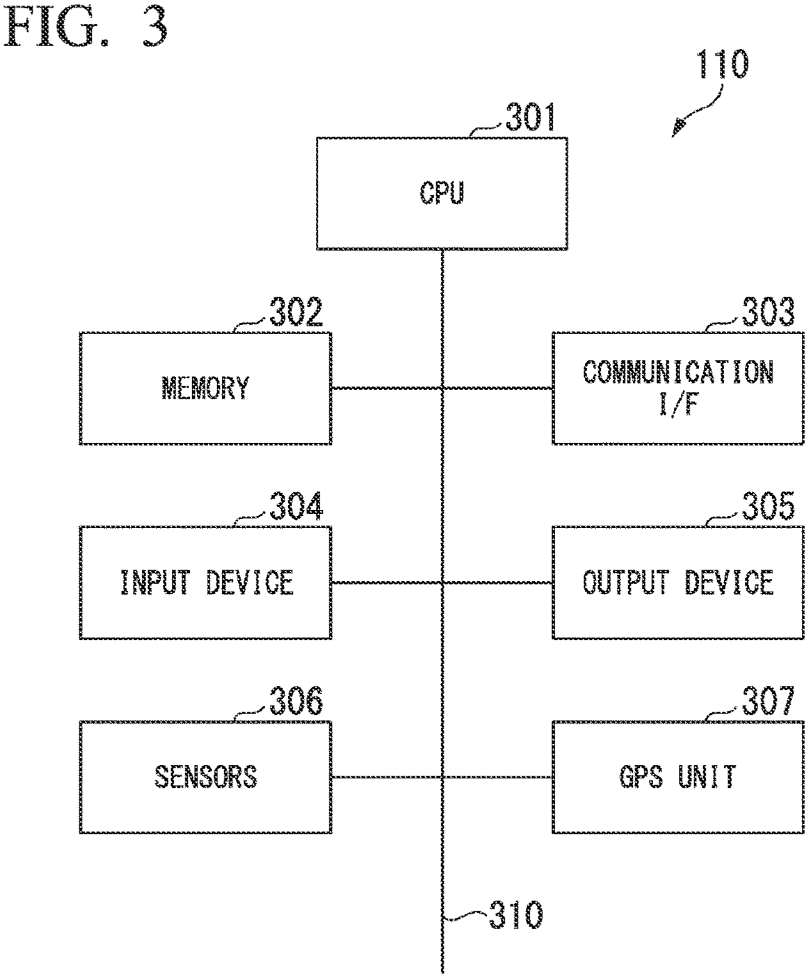
FIG. 3 is a block diagram illustrating an example of a hardware configuration of a vehicle 110.

FIG. 3 is a block diagram illustrating an example of a hardware configuration of a vehicle 110. In FIG. 3, the vehicle 110 includes a CPU 301, a memory 302, a communication I/F 303, an input device 304, an output device 305, various sensors 306, and a global positioning system (GPS) unit 307. These constituent units are connected to each other via a bus 310.

The CPU 301 is a central processing unit and controls the operation of the vehicle 110 by reading and executing various programs stored in the memory 302. The various programs include an operation schedule management program according to this embodiment.

The memory 302 includes, for example, a ROM, a RAM, a hard disk, and an SSD. The ROM is a memory dedicated for reading and stores various types of information used by the CPU 301 in addition to programs. The RAM is a readable or writable memory and stores various types of information. For example, the RAM stores information acquired from the outside or information generated through processing. The memory 302 includes a detachable storage medium such as a USB memory or an optical disc.

The communication I/F 303 serves as an internal interface between the network 120 and the vehicle and controls inputting and outputting of data from and to another device such as the operation schedule management server 100. The other device includes a work staff terminal.

The input device 304 is an operation unit that receives various inputs. The input device 304 includes hardware keys such as various switches or buttons or software keys such as buttons displayed on a touch panel. The input device 304 includes a microphone. The microphone receives an input of sound. Various inputs received by the input device 304 include inputs associated with an operation schedule. The operation schedule may be input from a work staff terminal by communication or the like.

The output device 305 includes a display or a speaker. The display displays various types of information. The various types of information include an operation schedule. The speaker outputs sound.

The sensors 306 include a vehicle speed sensor, an acceleration sensor, an angular velocity sensor, a tilt sensor, and a weight sensor. The sensors 306 output information for determining a position or behavior of the vehicle 110. Output values of the sensors 306 are used to calculate a current position of the vehicle 110 or to calculate a speed or a change of a bearing by the CPU 301. The weight sensor detects a weight of a load loaded to the vehicle 110. The sensors 306 output the detected values to the CPU 301.

The GPS unit 307 receives radio waves from GPS satellites and outputs information indicating the current position of the vehicle 110. The information indicating the current position is, for example, information for identifying one point in map data such as latitude, longitude, and altitude. The GPS unit 307 outputs the information indicating the current position to the CPU 301. The CPU 301 calculates the current position of the vehicle 110 on the basis of information output from the GPS unit 307 and the values detected by the sensors 306. Instead of or in addition to the GPS unit 307, beacons may be used to identify the position of the vehicle 110.

[Functional Configuration of Operation Schedule Management System 1]

Figure 4:
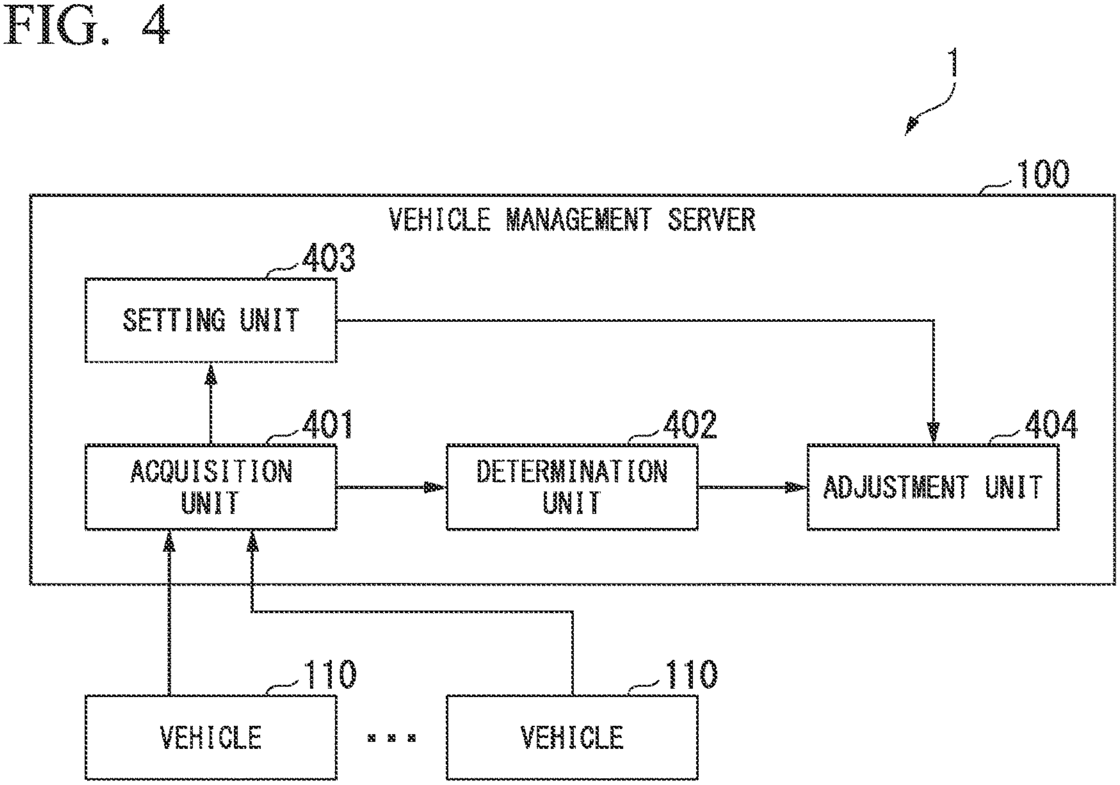
FIG. 4 is a block diagram illustrating an example of a functional configuration of the operation schedule management system 1.

FIG. 4 is a block diagram illustrating an example of a functional configuration of the operation schedule management system 1. In FIG. 4, the operation schedule management server 100 includes functional units such as an acquisition unit 401, a determination unit 402, a setting unit 403, and an adjustment unit 404. The functional units are realized by the CPU 201. That is, the CPU 201 realizes the functional units by executing an operation schedule management program stored in the memory 202. The functional configuration of the operation schedule management system 1 will be described below with reference to FIGS. 5 to 9.

The acquisition unit 401 acquires operation schedules of a plurality of vehicles 110. The operation schedules will be described below in detail with reference to FIGS. and 6A.

[Operation Schedule]

Figures 5, 6A:
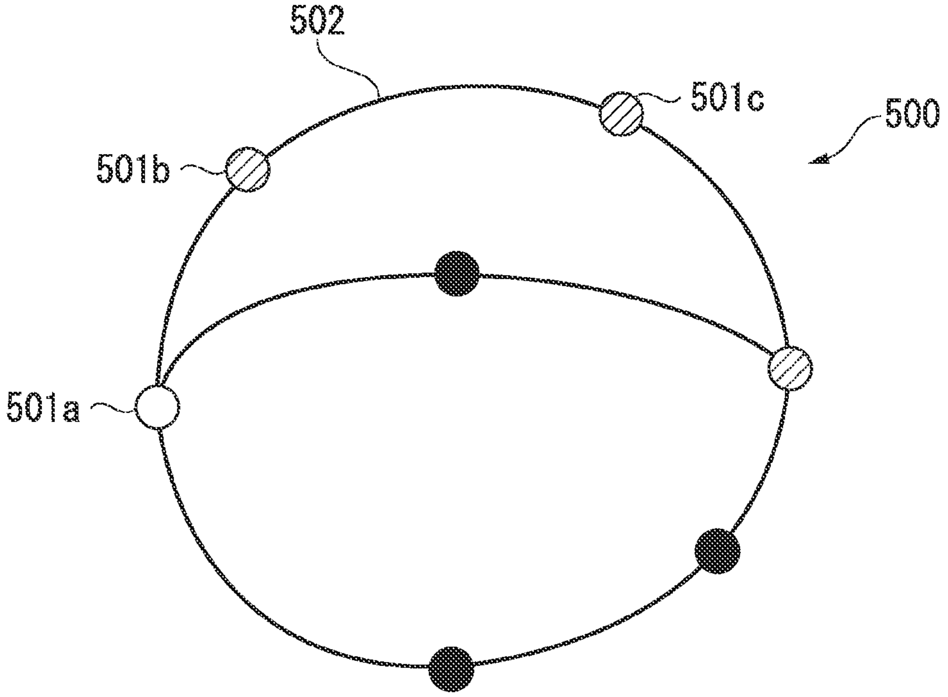
FIG. 5 is a diagram illustrating an example of a route indicated by an operation schedule.
FIG. 6A is a diagram illustrating an example of vehicle information 610 and an operation schedule 600.

FIG. 5 is a diagram illustrating an example of a route indicated by an operation schedule. In FIG. 5, an operation map 500 includes a plurality of nodes 501 (such as 501*a*, 501*b*, and 501*c*) and routes 502. Each node 501 is a position that may serve as a stop position. Each route 502 is a traveling route connecting the nodes 501. An operation schedule indicating routes and whether to perform loading/unloading at each node 501 is prepared for each vehicle 110.

FIG. 6A is a diagram illustrating an example of vehicle information 610 and an operation schedule 600. As illustrated in FIG. 6A, the operation schedule 600 is correlated with the vehicle information 610. The vehicle information is information for identifying a vehicle. The operation schedule 600 includes items such as "node," "arrival time," "departure time," and "load information." The items will be described below in detail.

"Node": Information for identifying a node 501. The information may be position information of the node 501.

"Arrival time": Time at which the corresponding vehicle 110 is scheduled to arrive at the corresponding node 501. A moving time period between nodes may be stored instead of the arrival time. In this case, the arrival time can be calculated on the basis of the departure time and the moving time period.

"Departure time": Time at which the corresponding vehicle 110 is scheduled to depart from the corresponding node 501. A moving time period between nodes may be stored instead of the departure time. In this case, the departure time can be calculated on the basis of the arrival time and the moving time period.

"Load information": This includes items of "presence of load" and "weight."

"Presence of load": This indicates whether to perform loading/unloading of a load at the corresponding node 501.

"Weight": Weight of a load on the corresponding vehicle 110. Specifically, this is a weight of a load which is loaded/unloaded.

The acquisition unit 401 acquires the operation schedules 600 of a plurality of vehicles 110. The acquisition unit 401 acquires, for example, the operation schedules 600 transmitted from the vehicle 110. The operation schedule 600 of the corresponding vehicle is input to each of the vehicles 110. Inputting of the operation schedule 600 to each vehicle 110 may be inputting of an operation by a work staff or may be inputting from a work staff terminal by communication or the like. The acquisition unit 401 is not limited to acquisition of the operation schedules 600 from the vehicles 110, but may acquire the operation schedules 600 for the vehicles 110 from a work staff terminal.

[Determination of Presence of Overlapping Stop]

The determination unit 402 determines whether there is an overlapping stop on the basis of the operation schedules 600. An overlapping stop means that a plurality of mobile objects stop at the same position (the same node 501) at the same time. In the following description, the "same position" is referred to as the "same stop position." The overlapping stop will be specifically described now.

Figure 6B:
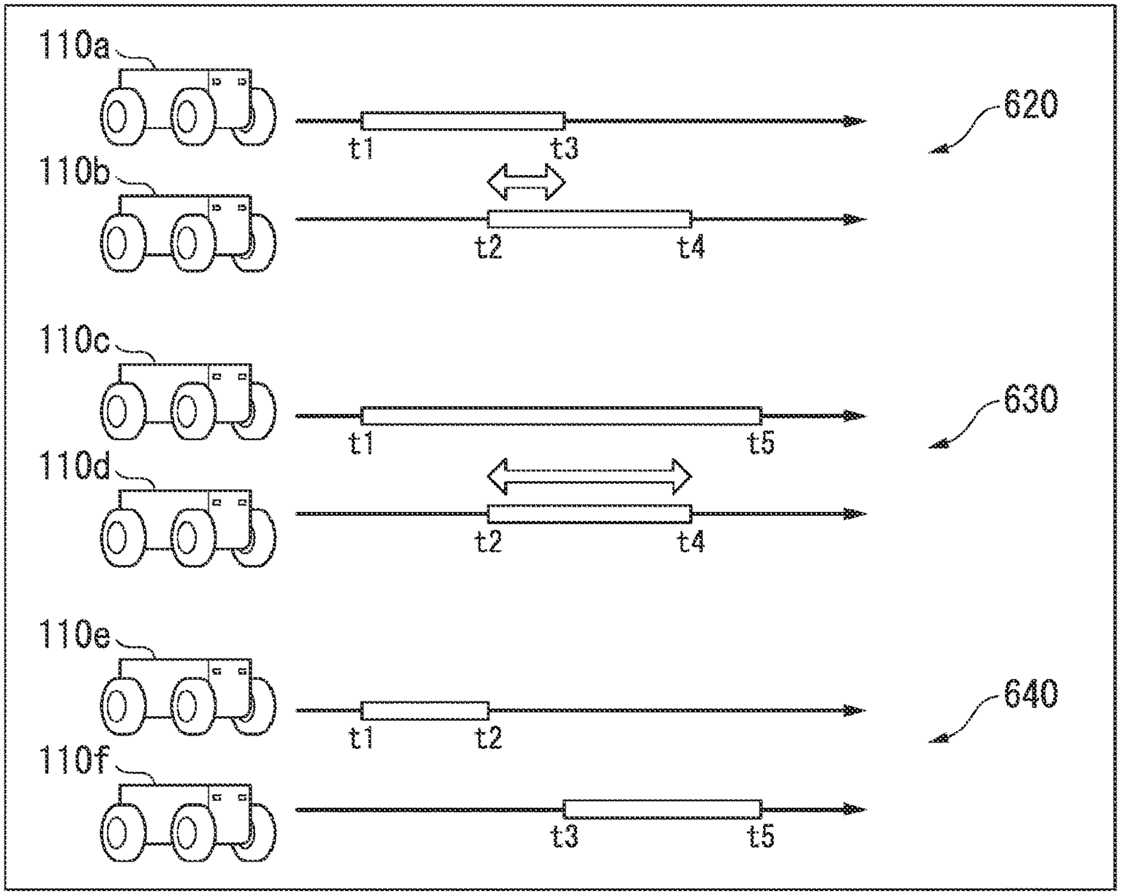
FIG. 6B is a diagram illustrating an example of an overlapping stop.

FIG. 6B is a diagram illustrating an example of the overlapping stop. In FIG. 6B, it is assumed that two vehicles stop at each of certain stop positions 620, 630, and 640.

Example 1 of Overlapping Stop

As illustrated in FIG. 6B, a vehicle 110*a* arrives at a stop position 620 at time t1 and departs from the stop position at time t3. A vehicle 110*b* arrives at the stop position 620 at time t2 and departs from the stop position at time t4. In the time period between times t2 and t3, the vehicles 110*a* and 110*b* stop at the stop position 620 in an overlapping manner.

Example 2 of Overlapping Stop

A vehicle 110*c* arrives at a stop position 630 at time t1 and departs from the stop position at time t5. A vehicle 110*d* arrives at the stop position 630 at time t2 and departs from the stop position at time t4. In the time period between times t2 and t4, the vehicles 110*c* and 110*d* stop at the stop position 630 in an overlapping manner.

[Example in which there is No Overlapping Stop]

A vehicle 110*e* arrives at a stop position 640 at time t1 and departs from the stop position at time t2. A vehicle 110*f* arrives at the stop position 640 at time t3 and departs from the stop position at time t5. In this case, at no time do the vehicles 110*e* and 110*f* both stop at the stop position 640, that is, they do not stop in an overlapping manner.

The determination unit 402 extracts stop positions of the vehicles 110 from the operation schedules 600 of the vehicles 110 and determines whether there is an overlapping stop at the extracted stop position in each time period.

[Stoppable Range]

The setting unit 403 sets a stoppable range in which a plurality of vehicles 110 can stop at the same stop position. The stoppable range is, for example, a range in which several or several tens of vehicles 110 can stop. In this embodiment, the setting unit 403 sets a stoppable range for all the stop positions (all the nodes) in addition to the same stop position.

Figure 7:
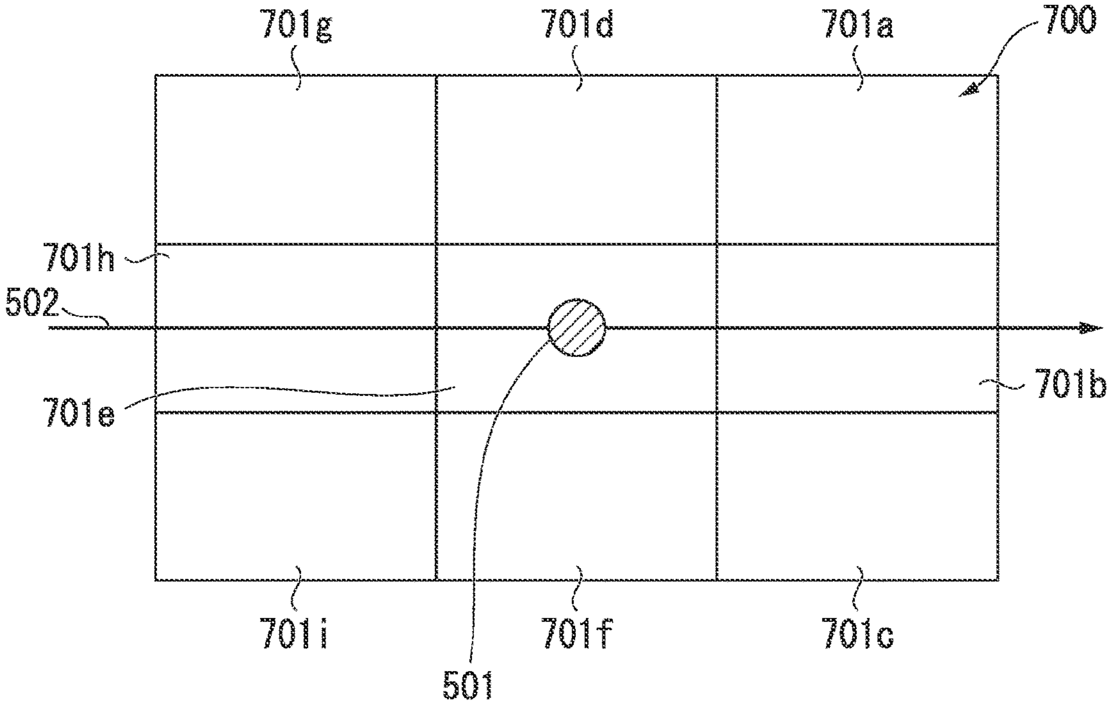
FIG. 7 is a diagram illustrating an example of a stoppable range.

FIG. 7 is a diagram illustrating an example of the stoppable range. In FIG. 7, the rightward direction of a route 502 is set as the traveling direction of a vehicle 110. As illustrated in FIG. 7, the stoppable range 700 is an area including the node 501 which is the stop position. The stoppable range 700 includes a plurality of ("9" in the drawing) sections 701 (701*a* to 701*i*). A vehicle 110 can stop in one section 701 of the plurality of sections 701. In the following description, one section 701 in which a vehicle 110 stops is referred to as a "stop location." When the determination unit 402 determines that there is no overlapping stop, the vehicle 110 stops at a stop location including the node 501 (the section 701*e*).

On the other hand, when the determination unit 402 determines that there is an overlapping stop, the stop locations of the vehicles 110 are adjusted. Specifically, the adjustment unit 404 adjusts the stop locations such that the stop locations of the vehicles 110 do not overlap in the stoppable range 700. For example, when it is determined that two vehicles 110 stop in an overlapping manner, the adjustment unit 404 may set the stop location of one vehicle 110 to a section 701*e* and adjust the stop location of the other vehicle 110 to a section 701 other than the section 701*e*. That is, the adjustment unit 404 may adjust the stop location of the other vehicle 110 in one of a longitudinal direction and a lateral direction in the traveling direction with respect to the section 701*e* including the node 501.

[Adjustment of Stop Location Based on Departure Time]

When a vehicle 110 with a later departure time stops in front of a vehicle 110 with an earlier departure time, departure of the vehicle 110 with the earlier departure time may be hindered. Therefore, in this embodiment, the adjustment unit 404 adjusts the stop location on the basis of the departure time when there is an overlapping stop. Specifically, the adjustment unit 404 adjusts the stop location of a vehicle 110 with an earlier departure time out of a plurality of vehicles 110 stopping in an overlapping manner to an area forward in the traveling direction of the vehicles 110 in the stoppable range 700.

Figure 8:
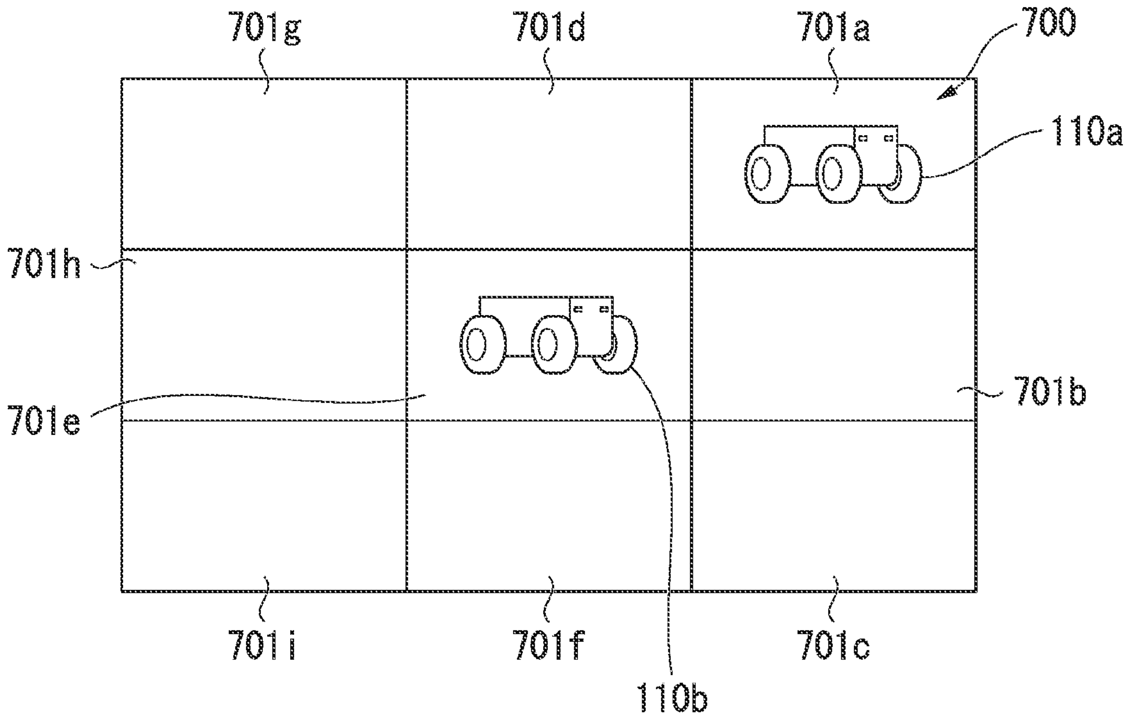
FIG. 8 is a diagram illustrating an example of adjustment of a stop location based on a departure time.

FIG. 8 is a diagram illustrating an example of adjustment of the stop location based on the departure time. In FIG. 8, the departure time of a vehicle 110*a* is earlier than the departure time of a vehicle 110*b*. Accordingly, the stop location of the vehicle 110*a* is adjusted to a forward section 701*a*. The stop location of the vehicle 110*a* is not limited to the section 701*a*, and may be adjusted to a section 701*b* or 701*c*. When the stop location of the vehicle 110*b* is adjusted to a rearward section 701 (701*g*, 701*h*, or 701*i*), the stop location of the vehicle 110*a* may be adjusted to a central section 701 (701*d*, 701*e*, or 701*f*).

When a plurality of vehicles 110 depart at the same time, for example, adjustment may be performed as follows.

A vehicle 110 stopped in a forward section 701 in the traveling direction in the stoppable range 700 departs first.

When the vehicles stop transversely, that is, in sections 701 overlapping in the lateral direction (for example, sections 701*a*, 701*b*, and 701*c*), the vehicles depart in the order of vehicle numbers indicated by the vehicle information 610 (FIG. 11).

[Adjustment of Stop Location Based on Information of Load]

When there is no space around the vehicle 110 at the time of loading/unloading of a load, work efficiency decreases. Therefore, the adjustment unit 404 adjusts the stop locations of the mobile objects on the basis of information of a load. The information of a load is presence information indicating whether there is a load and weight information indicating a weight of the load. The information of a load may include information indicating the size of the load and contents of the load instead of or in addition to the information. The contents of a load include, for example, the name of the load, details indicating whether the load is a staple article, or details indicating whether the load is a dangerous article. The information of a load is acquired on the basis of the operation schedules 600.

The adjustment unit 404 adjusts the stop locations of the vehicles 110 on the basis of the information of a load. For example, the adjustment unit 404 adjusts the stop location of a vehicle 110 with a load to an area close to an outer edge of the stoppable range 700 on the basis of the presence information of a load. The area close to the outer edge includes, for example, sections 701*a*, 701*c*, 701*g*, and 701*i* at four corners in the stoppable range 700 illustrated in FIG. 8. The area close to the outer edge may include other sections 701*b*, 701*d*, 701*f*, and 701*h* adjacent to the outer edge in addition thereto. Since a space can be secured by causing the vehicle 110 with a load to stop in the vicinity of the outer edge in this way, it is possible to easily perform loading/unloading of a load.

The information of a load is not limited to being acquired based on the operation schedules 600. The information of a load may be acquired on the basis of the weight sensors (various sensors 306) instead of or in addition to the operation schedules 600. For example, when unloading at a certain stop location is scheduled in the operation schedule 600, but the corresponding vehicle does not actually include a load, unloading work is not carried out. Accordingly, the adjustment unit 404 may adjust the stop locations of the vehicles 110 on the basis of results of detection from the weight sensors.

The adjustment unit 404 may adjust the stop locations on the basis of the departure times when the stop locations of the vehicles 110 are adjusted on the basis of the information of a load. That is, the stop location of a vehicle 110 with an earlier departure time out of the vehicles 110 with a load may be adjusted to the section 701*a* or 701*c* at forward corners.

In view of curbing a delay in operation, the adjustment unit 404 adjusts the stop locations with a higher priority given to the information of the departure times than the information of a load. Specifically, the adjustment unit 404 adjusts the stop location of a vehicle 110 with an earlier departure time to a stop location forward in the traveling direction regardless of whether a load is. When there is no load in the corresponding vehicle 110, the adjustment unit 404 does not need adjustment of the stop location to the vicinity of the outer edge from the stop location forward in the traveling direction. On the other hand, when there is a load in the corresponding vehicle 110, the adjustment unit 404 adjusts the stop location to the vicinity of the outer edge from a stop location forward in the traveling direction.

[Adjustment of Stop Location Based on Weight Information]

At the time of loading/unloading of a load, more time and load may be required for loading/unloading as the weight of a load becomes heavier. Therefore, the adjustment unit 404 adjusts the stop location to an area closer to the outer edge of the stoppable range 700 as the weight of the load becomes heavier on the basis of the weights indicated by the weight information. The weight information is acquired on the basis of the operation schedules 600.

For example, when 9 vehicles 110 with a load stop in an overlapping manner, the adjustment unit 404 arranges the vehicles 110 at the sections 701*a*, 701*c*, 701*g*, and 701*i* at four corners in descending order of the weights. Then, the adjustment unit 404 arranges the vehicles 110 at other sections 701*b*, 701*d*, 701*f*, and 701*h* adjacent to the outer edge in descending order of the weights. A vehicle 110 with a lightest load is arranged in the section 701*e*.

The weight information may be acquired on the basis of the weight sensors (various sensors 306) instead of or in addition to the operation schedules 600. For example, a weight in the operation schedule 600 may be different from an actual weight. Accordingly, the adjustment unit 404 may adjust the stop locations of the vehicles 110 on the basis of results of detection from the weight sensors.

The adjustment unit 404 may also adjust the stop locations on the basis of the departure times when the stop locations of the vehicles 110 are adjusted on the basis of the weight information. In view of curbing a delay in operation, the adjustment unit 404 adjusts the stop locations with a higher priority given to the information of the departure times than the information of a load.

Specifically, the adjustment unit 404 adjusts the stop location of a vehicle 110 with an earlier departure time to a stop location forward in the traveling direction regardless of the presence of a load and the weight. When there is no load in the corresponding vehicle 110, the adjustment unit 404 does not need adjustment of the stop location to the vicinity of the outer edge from the stop location forward in the traveling direction. On the other hand, when there is a load in the corresponding vehicle 110, the adjustment unit 404 preferentially adjusts the stop location of a vehicle 110 with a heavier load to the vicinity of the outer edge from the stop location forward in the traveling direction.

[Adjustment of Stop Location Such that Vehicles 110 are not Adjacent to Each Other]

When vehicles 110 stop adjacent to each other in the stoppable range 700, loading/unloading may be difficult or a work staff may have difficulty getting out. Therefore, the adjustment unit 404 adjusts the stop locations of the vehicles 110 such that two sections 701 adjacent in the longitudinal direction (for example, sections 701*a* and 701*d*) of the traveling direction of the vehicles 110 are not both set as the stop locations. The adjustment unit 404 adjusts the stop locations of the vehicles 110 such that the two sections 701 adjacent in the lateral direction (for example, the sections 701*a* and 701*d*) of the traveling direction of the vehicles 110 are not both set as the stop locations.

Figure 9:
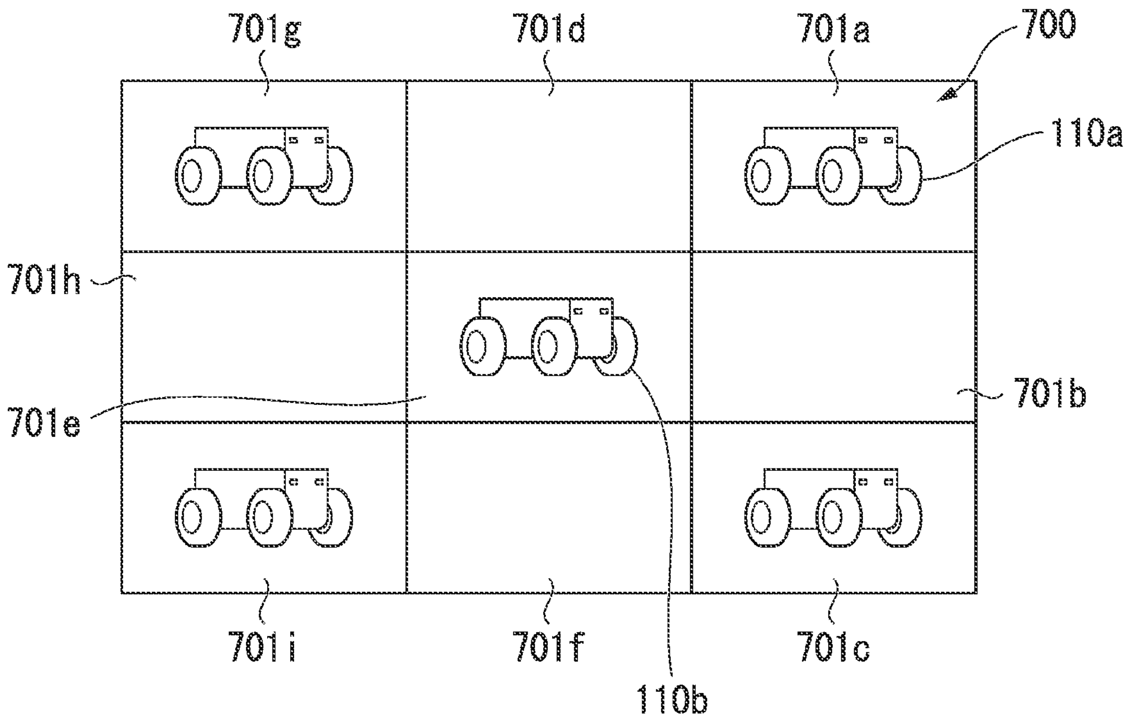
FIG. 9 is a diagram illustrating an example of arrangement of vehicles 110 when stop locations are adjusted such that the vehicles 110 are not adjacent.

FIG. 9 is a diagram illustrating an arrangement example of vehicles 110 when the stop locations are adjusted such that the vehicles 110 are not adjacent to each other. As illustrated in FIG. 9, the stop locations are adjusted such that two sections 701 in both of the longitudinal direction and the lateral direction are not both set as the stop locations. The present invention is not limited to both of the longitudinal direction and the lateral direction, and the adjustment unit 404 may adjust the stop locations such that the two sections 701 in only the longitudinal direction or in only the lateral direction are not both set as the stop locations. The adjustment unit 404 adjusts the stop locations of the vehicles 110 on the basis of the departure times even when the vehicles 110 are arranged not to be adjacent to each other.

The functional units illustrated in FIG. 4 are realized, for example, by causing a hardware processor such as the CPU 201 to execute a program (software). Some or all of the constituents may be realized by hardware (a circuit unit including circuitry) such as a large-scale integration (LSI), an application-specific integrated circuit (ASIC), a field-programmable gate array (FPGA), or a graphics processing unit (GPU) or may be cooperatively realized by software and hardware.

[Operation Schedule Managing Process Performed by Operation Schedule Management Server 100]

Figure 10:
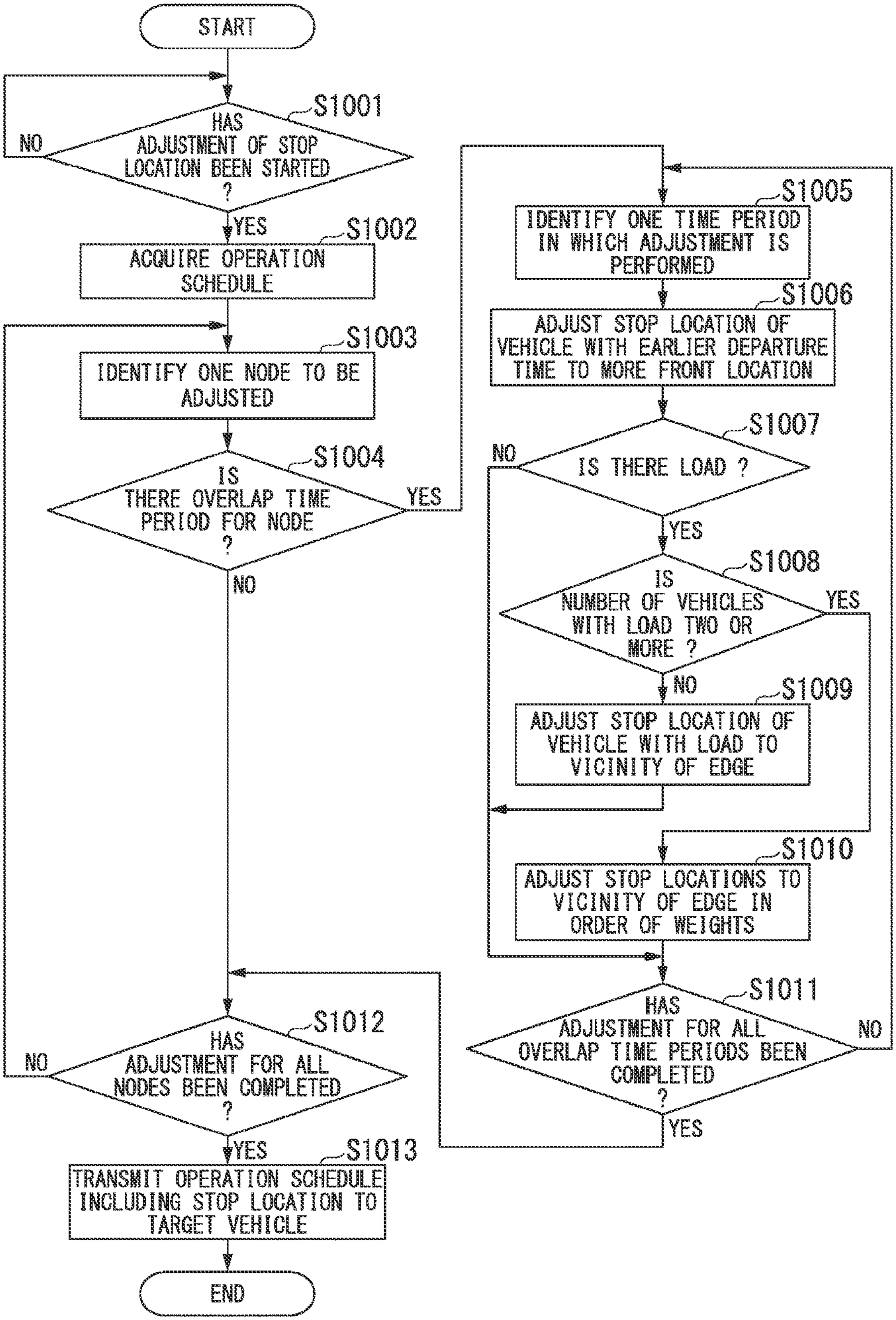
FIG. 10 is a flowchart illustrating an example of an operation schedule managing process which is performed by the operation schedule management server 100.

FIG. 10 is a flowchart illustrating an example of an operation schedule managing process which is performed by the operation schedule management server 100. In FIG. 10, the operation schedule management server 100 determines whether it is time to start adjustment of stop locations of vehicles 110 (Step S1001). Examples of the timing at which adjustment is to be started will be described below.

- A timing which is a predetermined time at which work is started (one timing every morning)
- A timing at which an instruction to perform adjustment is received from a work staff
- A timing at which the operation schedule 600 of one vehicle 110 is changed
- A timing at which one vehicle 110 departs from a stop location The operation schedule management server 100 waits until it is time to start adjustment (Step S1001: NO). When it is time to start the adjustment (Step S1001: YES), the operation schedule management server 100 acquires the operation schedules 600 of the vehicles 110 (Step S1002).

Then, the operation schedule management server 100 identifies one node 501 to be adjusted out of a plurality of nodes 501 on the basis of the operation schedules 600 (Step S1003). Then, the operation schedule management server 100 determines whether there is a time period in which an overlapping stop occurs (an overlap time period) at the identified one node 501 (Step S1004).

When there is no overlap time period (Step S1004: NO), the operation schedule management server 100 does not perform adjustment of a stop location and causes the routine to proceed to Step S1013. In this case, a stop location of a vehicle arriving at the node 501 in the time period is a section 701*e* including the node 501 (FIG. 7).

On the other hand, when it is determined in Step S1004 that there is an overlap time period (Step S1004: YES), the operation schedule management server 100 identifies one overlap time period in which adjustment is performed out of the overlap time periods (Step S1005). Then, the operation schedule management server 100 adjusts the stop locations of the vehicles 110 with earlier departure times to sections 701 more forward in the stoppable range 700 (Step S1006).

Then, the operation schedule management server 100 determines whether there is a load in each of a plurality of vehicles 110 which stop in an overlapping manner (Step S1007). When there is no load in any vehicle 110 (Step S1007: NO), the operation schedule management server 100 causes the routine to proceed to Step S1011.

On the other hand, when at least one vehicle 110 includes a load (Step S1007: YES), the operation schedule management server 100 determines whether the number of vehicles 110 with a load is two or more (Step S1008). When the number of vehicles 110 with a load is not two or more (Step S1008: NO), that is, when the number of vehicles 110 with a load is one, the operation schedule management server 100 adjusts the stop location of the vehicle 110 with a load to an area close to the outer edge of the stoppable range 700 (the section 701*a* or the like) (Step S1009) and causes the routine to proceed to Step S1011.

On the other hand, when the number of vehicles 110 with a load is two or more (Step S1008: YES), the operation schedule management server 100 adjusts the stop locations of the vehicles 110 to areas close to the outer edge of the stoppable range 700 as the weight of the load becomes lighter (Step S1010).

Then, the operation schedule management server 100 determines whether adjustment of the stop locations has been completed for all the overlap time periods at the node 501 (Step S1011). When adjustment of the stop locations has not been completed for all the overlap time periods (Step S1011: NO), the operation schedule management server 100 causes the routine to return to Step S1005 and repeatedly performs the processes of Steps S1005 to S1011.

On the other hand, when it is determined in Step S1011 that adjustment of the stop locations has been completed for all the overlap time periods (Step S1011: YES), the operation schedule management server 100 determines whether adjustment of the stop locations has been completed for all the nodes 501 in the operation schedules 600 (Step S1012). When adjustment of the stop locations has not been completed for all the nodes 501 (Step S1012: NO), the operation schedule management server 100 causes the routine to return to Step S1003 and performs the processes of Steps S1003 to S1012.

On the other hand, when it is determined in Step S1012 that adjustment of the stop locations has been completed for all the nodes 501 (Step S1012: YES), the operation schedule management server 100 transmits an operation schedule 1100 including an item of a stop location indicating the adjusted stop locations (FIG. 11) to a target vehicle 110 (Step S1013) and ends this routine. The target vehicle 110 is a vehicle of which the stop location has been adjusted.

FIG. 11 is a diagram illustrating an example of the operation schedule 1100 in which the stop locations have been adjusted. As illustrated in FIG. 11, the operation schedule 1100 is correlated with the vehicle information 610. The operation schedule 1100 is different from the operation schedule 600 illustrated in FIG. 6A in that it includes an item of "stop location." The "stop location" indicates a section 701 at a node "N001" in which an overlapping stop occurs. Accordingly, the vehicles 110 can stop at the stop location indicated by the section 701 at the stop position at which an overlapping stop occurs.

The operation schedule management system 1 according to the aforementioned embodiment sets the stoppable range 700 at the same stop position on the basis of the operation schedule 600. When it is determined that there is an overlapping stop, the operation schedule management system 1 adjusts the stop locations of the vehicles 110 such that the stop locations of the vehicles 110 do not overlap in the stoppable range 700. Accordingly, it is possible to curb a delay in operation. It is also possible to curb occurrence of congestion at the stop position. As a result, it is possible to efficiently carry a load.

In the operation schedule management system 1 according to the embodiment, the operation schedule 600 includes departure times at which the vehicles 110 depart from the same stop position. The operation schedule management system 1 adjusts the stop location of a vehicle 110 with an earlier departure time out of a plurality of vehicles 110 to a location forward in the stoppable range 700. Accordingly, it is possible to prevent a vehicle 110 with a later departure time from stopping in front of the vehicle 110 with an earlier departure time. As a result, it is possible to prevent departure of the vehicle 110 with an earlier departure time from being hindered.

In the operation schedule management system 1 according to the embodiment, the operation schedule 600 includes information of a load which is loaded on each vehicle 110. The operation schedule management system 1 adjusts the stop locations of the vehicles 110 on the basis of the information of a load. Accordingly, it is possible to provide a space around the vehicle 110 at the time of loading/unloading. As a result, it is possible to improve work efficiency associated with loading/unloading of a load.

In the operation schedule management system 1 according to the embodiment, the information of a load includes presence information indicating whether there is a load. The operation schedule management system 1 adjusts the stop location of a vehicle 110 with a load to an area close to the outer edge of the stoppable range 700 on the basis of the presence information. By causing the vehicle 110 with a load to stop in the vicinity of the outer edge in this way, it is possible to secure a more optimal space. Accordingly, it is possible to further improve work efficiency associated with loading/unloading.

In the operation schedule management system 1 according to the embodiment, the information of a load includes weight information indicating a weight of the load. The operation schedule management system 1 adjusts the stop location of a vehicle to an area closer to the outer edge of the stoppable range 700 as the weight of the load becomes heavier on the basis of the weight indicated by the weight information. Accordingly, it is possible to efficiently perform loading/unloading of a heavy load.

In the operation schedule management system 1 according to the embodiment, the stoppable range 700 is set to an area including a plurality of sections 701, and the stop location of a vehicle 110 is set to one section 701 of the plurality of sections 701. The operation schedule management system 1 adjusts the stop locations of the vehicles 110 such that both of two sections 701 adjacent in the longitudinal direction of the traveling direction of the vehicles 110 are not set as the stop locations or such that both of two sections adjacent in the lateral direction of the traveling direction of the vehicles 110 are not set as the stop locations. Accordingly, it is possible to curb stopping of the vehicles 110 to be adjacent to each other in the stoppable range 700. As a result, it is possible to improve work efficiency associated with loading/unloading.

In the embodiment, an example in which the functional units illustrated in FIG. 4 are provided in the operation schedule management server 100 has been described above, but the present invention is not limited thereto. The functional units may be provided in another device. The other device may be, for example, one vehicle 110. That is, one vehicle 110 may serve as a master and manage the operation schedules 600 of the other vehicles 110. The other device may be a personal computer provided in a construction site. That is, the personal computer may manage the operation schedules 600.

Some or all of the processes which are performed by the operation schedule management server 100 may be performed by recording a program for realizing some or all of the functions of the operation schedule management server 100 according to the present invention on a computer-readable recording medium and causing a computer system to read and execute the program recorded on the recording medium. The "computer system" mentioned herein may include an operating system (OS) or hardware such as peripherals. The "computer system" may include a WWW system including a homepage provision environment (or a homepage display environment). Examples of the "computer-readable recording medium" include a portable medium such as a flexible disk, a magneto-optical disc, a ROM, or a CD-ROM and a storage device such as a hard disk incorporated into a computer system. The "computer-readable recording medium" may include a medium that holds a program for a predetermined time such as a non-volatile memory (a RAM) in a computer system serving as a server or a client when a program is transmitted via a network such as the Internet or a communication line such as a telephone line.

The program may be transmitted from a computer system storing the program in a storage device or the like to another computer system via a transmission medium or using carrier waves in the transmission medium. The "transmission medium" for transmitting a program is a medium having a function of transmitting information such as a network (a communication network) such as the Internet or a communication circuit (a communication line) such as a telephone circuit. The program may be a program for realizing some of the aforementioned functions. The program may be a so-called differential file (a differential program) which can realize the aforementioned functions in combination with another program stored in advance in the computer system.

While a mode for carrying out the present invention has been described above with reference to an embodiment, the present invention is not limited to the embodiment, and various modifications and substitutions can be performed thereon without departing from the gist of the present invention.

EXPLANATION OF REFERENCES

1 . . . . Operation schedule management system
100 . . . . Operation schedule management server
110 . . . . Vehicle
401 . . . . Acquisition unit
402 . . . . Determination unit
403 . . . . Setting unit
404 . . . . Adjustment unit
600, 1100 . . . . Operation schedule
700 . . . . Stoppable range
701 . . . . Section

What is claimed is:

1. An operation schedule management device comprising:
a memory storing computer-readable instructions; and
at least one processor connected to the memory,
wherein the processor executes the computer-readable instructions to:
acquire operation schedules of a plurality of mobile load carriers, the operation schedules including load information about each load carried by respective mobile load carriers;
determine, based on the operation schedules, whether at least two of the mobile load carriers stop at a same destination location at a same time;
when it is determined that the at least two mobile load carriers stop at the same destination location at the same time,
set, at the same destination location, a loading area in which the at least two mobile load carriers are able to stop; and
adjust positions of stopping spaces of the at least two mobile load carriers based on the load information such that the stopping spaces do not overlap within the loading areas,
wherein the adjust positions sets a first stop location of a first mobile load carrier and sets a second stop location of another mobile load carrier, wherein the first stop location is set and the second stop location is adjusted to stop in either the longitudinal direction or lateral direction so that the stop locations do not overlap.

2. The operation schedule management device according to claim 1, wherein the operation schedule includes schedules include a departure time at which corresponding mobile object mobile load carriers depart departs from a departure position the same position, and wherein the adjustment unit processor is configured to adjust a stopping space adjusts the stop location of a mobile object mobile load carrier having an earlier departure time out of among the plurality of mobile load carriers mobile objects to an area which is a position located in front of the corresponding mobile object the mobile load carrier in a traveling direction in the loading area of the mobile object in the stoppable range.

3. The operation schedule management device according to claim 1, wherein the information of a load the load information includes presence information indicating whether a load is present, and wherein the adjustment unit adjusts processor is configure to adjust the stop location a stopping space of a mobile object mobile load carrier having a load to an area close to position close to an outer edge of the stoppable range the loading area based on the presence information on the basis of the presence information.

4. The operation schedule management device according to claim 1, wherein the information of a load the load information includes weight information indicating a weight of the load, and wherein the adjustment unit adjusts processor is configured to adjust the stop location a stopping space of a mobile object mobile load carrier to an area closer to a position close to an outer edge of the stoppable range loading area as the weight of the load becomes larger on the basis of the weight indicated by the weight information increases.

5. The operation schedule management device according to claim 1 or 2, wherein the stoppable range is an area including the loading area includes a plurality of sections, wherein the stop location each stopping space of each mobile object the mobile carriers corresponds to one of the sections is one section of the plurality of sections, and wherein the adjustment unit adjusts processor is configure to adjust the stopping spaces the stop locations of the mobile objects such that two sections adjacent to each other in a longitudinal direction with respect to a traveling direction of the mobile load carrier, mobile objects are not both set as the stop locations or such that two sections adjacent to each other in a lateral direction with respect to the traveling direction, are not both assigned as the stopping spaces stop locations.

6. An operation schedule management method that is performed by a computer of an operation schedule management device, the operation schedule management method comprising: an acquisition step of acquiring operation schedules schedule of each of a plurality of mobile objects mobile load carriers, the operation schedules including load information about each load carried by respective mobile load carriers; a determination step of determining, based on the operation schedules, presence of an overlapping stop indicating that a plurality of mobile objects stop whether at least two of the mobile load carriers stop at a same position destination location at a same time on the basis of the operation schedules; when it is determined that the at least two mobile load carriers stop at the same destination location at the same time, a setting step of setting, at the same destination location, a stoppable range a loading area in which a plurality of mobile objects the at least two mobile load carriers are able to stop at the same position; and an adjustment step of adjusting positions of stopping spaces stop locations of the mobile objects the at least two mobile load carriers based on the load information such that the stop locations stopping spaces do not overlap within the loading area wherein the adjust positions sets a first stop location of a first mobile load carrier and sets a second stop location of another mobile load carrier, wherein the first stop location is set and the second stop location is adjusted to stop in either the longitudinal direction or lateral direction so that the stop locations do not overlap.

7. An operation schedule management system comprising: a plurality of mobile load carriers mobile objects; and an operation schedule management device configured to manage operation schedules of mobile load carriers the plurality of mobile objects, wherein the operation schedule management device includes: a memory storing computer-readable instructions; and at least one processor connected to the memory, wherein the processor executes the computer-readable instructions to: an acquisition unit configured to acquire the operation schedules of the mobile load carriers, the operation schedules including load information about each load carried by respective mobile load carriers the plurality of mobile objects; a determination unit configured to determine, based on the operating schedules, whether at least two of the mobile load carriers stop at a same destination location at a same time presence of an overlapping stop indicating that a plurality of mobile objects stop at the same position at the same time on the basis of the operation schedules; when it is determined that the at least two mobile load carriers stop at the same destination location at the same time, a setting unit configured to set, at the same destination location, a loading area a stoppable range in which a plurality of mobile objects the at least two mobile load carriers are able to stop at the same position; and an adjustment unit configured to adjust stop locations of the mobile objects positions of stopping spaces of the at least two mobile load carriers based on the load information such that the stop locations the stopping spaces do not overlap within the loading area wherein the adjust positions sets a first stop location of a first mobile load carrier and sets a second stop location of another mobile load carrier, wherein the first stop location is set and the second stop location is adjusted to stop in either the longitudinal direction or lateral direction so that the stop locations do not overlap.

8. An operation schedule management device comprising: a memory storing computer-readable instructions; and at least one processor connected to the memory, wherein the processor executes the computer-readable instructions to: acquire operation schedules of a plurality of mobile load carriers, the operation schedules including weight information indicating weights of loads carried by the respective mobile load carriers; determine, based on the operation schedules, whether at least two of the mobile load carriers stop at the same destination location at the same time; when it is determined that the at least two mobile load carriers stop at the same destination location at the same time, set, at the destination location, a loading area in which the at least two mobile load carriers are able to stop; and adjust positions of stopping spaces of the at least two mobile load carriers based on the weight information such that the stopping spaces do not overlap within the loading area wherein the adjust positions sets a first stop location of a first mobile load carrier and sets a second stop location of another mobile load carrier, wherein the first stop location is set and the second stop location is adjusted to stop in either the longitudinal direction or lateral direction so that the stop locations do not overlap.

* * * * *